US008628195B2

(12) United States Patent
Lapprand

(10) Patent No.: US 8,628,195 B2
(45) Date of Patent: Jan. 14, 2014

(54) ANTIREFLECTION OPHTHALMIC LENS AND METHOD OF MANUFACTURE METHOD

(75) Inventor: Aude Lapprand, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 13/470,488

(22) Filed: May 14, 2012

(65) Prior Publication Data

US 2012/0293768 A1    Nov. 22, 2012

(30) Foreign Application Priority Data

May 16, 2011   (FR) ...................... 11 54226

(51) Int. Cl.
G02C 7/02 (2006.01)
G02B 1/04 (2006.01)
G02B 1/11 (2006.01)

(52) U.S. Cl.
USPC ................. 351/159.57; 351/159.62; 359/653; 359/796

(58) Field of Classification Search
CPC ...... G02C 7/022; G02C 2202/16; G02B 1/04; G02B 1/041; G02B 1/043; B29D 11/0073
USPC ............. 351/159.01, 159.57, 159.6, 159.62, 351/159.7; 359/642, 652–654, 741, 796, 359/797

See application file for complete search history.

(56) References Cited

U.S. PATENT DOCUMENTS

| 3,620,888 | A  | * | 11/1971 | Buzzell ........................ 428/508 |
| 7,175,878 | B2 | * | 2/2007  | Helmstetter et al. .......... 427/162 |
| 7,289,257 | B1 | * | 10/2007 | Nakagoshi .................... 359/241 |
| 2005/0238882 | A1 | | 10/2005 | Vu |
| 2005/0269721 | A1 | | 12/2005 | Adileh et al. |
| 2007/0270062 | A1 | | 11/2007 | Weber |
| 2009/0097129 | A1 | * | 4/2009  | Naito et al. ................... 359/653 |
| 2010/0328605 | A1 | * | 12/2010 | Suzuki .......................... 351/166 |
| 2012/0026456 | A1 | * | 2/2012  | Nishimoto et al. ........... 351/159 |

FOREIGN PATENT DOCUMENTS

EP    2119553 A2   11/2009

* cited by examiner

Primary Examiner — Darryl J Collins
(74) Attorney, Agent, or Firm — Vedder Price P.C.; Thomas J. Kowalski; Samuel H. Megerditchian

(57) ABSTRACT

The invention relates to an optical article including a transparent substrate of organic glass, preferably a substrate of an ophthalmic lens, an adhesive layer covering at least one of the faces of the transparent substrate, a transparent film of thermoplastic polymer fixed on the transparent substrate by means of the adhesive layer, an anti-abrasion hard coating covering the transparent film of thermoplastic polymer, and a multilayer antireflection coating formed from alternating mineral layers with high and low refractive index. The invention also relates to a method of manufacturing said article.

15 Claims, No Drawings

ANTIREFLECTION OPHTHALMIC LENS AND METHOD OF MANUFACTURE METHOD

The present invention relates to an optical article, preferably an ophthalmic lens, comprising a transparent substrate, a transparent thermoplastic film glued onto the transparent substrate via an adhesive layer, an abrasion-resistant and scratch-resistant coating and a multilayer antireflection coating, said article having improved resistance to cracking of the antireflection coating. The invention also relates to a method of manufacturing said article.

Anti-abrasion varnishes are known to reduce the impact toughness of organic ophthalmic lenses in an undesirable manner. One approach for solving this problem consisted of interposing, between the organic glass and the anti-abrasion varnish, a primary coat of elastomer (see for example U.S. Pat. No. 6,858,305 and U.S. Pat. No. 7,357,503). This primary coat, deposited in the form of a liquid composition and then optionally crosslinked, absorbs not only the impacts received by the anti-abrasion varnish but also ensures good adherence of the abrasive varnish on the substrate. Its thickness is generally between 1 and about 20 µm.

It is also known to coat optical articles such as ophthalmic lenses or screens with antireflection coatings formed by a multilayer stack of dielectric mineral materials such as SiO, $SiO_2$, $Si_3N_4$, $TiO_2$, $ZrO_2$, $Al_2O_3$, $MgF_2$ or $Ta_2O_5$. These antireflection coatings are always deposited on top of the anti-abrasion hard coatings.

One of the problems encountered with all types of mineral antireflection coatings deposited on organic substrates is their great fragility, due principally to their mineral nature. When the organic substrate of the optical article is submitted to considerable deformation or expansion, the antireflection coating is not generally able to follow this deformation and the resultant stress is then translated into cracking, which is propagated to the entire surface of the coating, generally making the article unusable. Leaving a pair of glasses with antireflection coating under the windscreen of a car exposed to the sun can thus lead after just a few minutes to an unacceptable reduction in transparency of the glasses.

As far as the applicant is aware, no effective means has been proposed to date for satisfactorily reducing the inherent fragility of antireflection coatings and for significantly increasing the temperature or stress of the optical article beyond which expansion or deformation of the substrate causes cracking of the antireflection coating.

The present application therefore proposes, for the first time, a means for satisfactorily "decoupling" the deformation and/or the expansion of organic substrates from that of the antireflection multilayer stacks with which they are coated.

This means consists of a transparent thermoplastic film having a glass transition temperature above room temperature, glued onto the organic substrate via an adhesive layer with low glass transition temperature. This thermoplastic film is coated with a conventional anti-abrasion varnish, which in its turn is coated with the antireflection coating.

The present invention therefore relates to an optical article comprising, in this order,
  (a) a transparent substrate of organic glass, preferably a substrate of an ophthalmic lens,
  (b) an adhesive layer covering at least one of the faces of the transparent substrate,
  (c) a transparent film of thermoplastic polymer fixed on the transparent substrate by means of the adhesive layer,
  (d) an anti-abrasion hard coating covering the transparent film of thermoplastic polymer, and
  (e) a multilayer antireflection coating formed from alternating mineral layers with high and low refractive index, characterized in that the thermoplastic polymer forming the transparent film is selected from cellulose triacetate (CTA) and poly(ethylene terephthalate) (PET); and the adhesive layer is a layer of pressure-sensitive adhesive or a layer of hot-melt adhesive.

In an optical article according to the invention, the primary coat of elastomer conventionally present under the anti-abrasion hard varnish is thus replaced with a thermoplastic film glued via an adhesive layer onto the organic substrate. As will be shown in the examples given below, this replacement translates into an increase in critical temperature of at least 20° C. and a doubling of the critical stress that the optical article can withstand without cracking of the antireflection coating.

The present invention also relates to a method of manufacturing said optical article comprising:
  (A) providing a transparent substrate, preferably a substrate of an ophthalmic lens, of organic glass,
  (B) depositing an anti-abrasion coating on a transparent film of thermoplastic polymer,
  (C) gluing the bilayer structure obtained in step (B) by means of an adhesive layer onto the transparent substrate, and
  (D) forming a multilayer antireflection coating consisting of alternating mineral layers of high and low refractive index, on the anti-abrasion hard coating.

Step (C) of gluing the bilayer structure, consisting of the film of the thermoplastic polymer coated on one of its faces with an anti-abrasion hard coating, can in principle be done in at least two different ways:
  the adhesive layer can first be applied on the face of the transparent thermoplastic film not covered with the anti-abrasion coating, the whole then being applied on the substrate, or else
  the adhesive layer can be applied on the substrate, and then the bilayer structure, prepared in step (B), is brought into contact with this adhesive layer on the substrate.

It is of course also possible to envisage successive application of a layer of adhesive, of a film of the thermoplastic polymer, of an anti-abrasion hard coating, and then of an antireflection coating on one or both faces of the substrate.

The organic substrate of the optical article of the present invention can be any organic substrate commonly used in the optical and in particular the ophthalmic field.

We may mention, as examples, substrates of polycarbonate, of polyamide, of polyimide, of polysulphone, of copolymers of poly(ethylene terephthalate) and of polycarbonate, of polyolefins, notably of polynorbornene, of homopolymers and copolymers of diethylene glycol bis(allylcarbonate), of (meth)acrylic polymers and copolymers, notably (meth)acrylic polymers and copolymers derived from bisphenol-A, of thio(meth)acrylic polymers and copolymers, of polyurethane and polythiourethane homopolymers or copolymers, epoxy polymers and copolymers and episulphide polymers and copolymers.

The organic substrate can be submitted, before application of or bringing into contact with the layer of adhesive, to a physical surface treatment, for example of the corona or plasma type, or chemical, generally intended to improve the adherence.

The polymer forming the thermoplastic film glued on the substrate must be a transparent polymer, i.e. a polymer having scattering of less than 0.5%, preferably between 0.2 and 0.3%, and a transmission factor at least equal to 90%, preferably between 93% and 98% (these measurements of scattering and transmission factor are carried out according to standard ASTM D1003 on a Haze Guard instrument).

Its glass transition temperature is above the temperature of use of the optical article, which is most often room temperature. The glass transition temperature of the polymer is generally between 50° C. and 250° C., preferably between 70 and 200° C. At the temperature of use, the thermoplastic film polymer is therefore not in the plastic state but in the vitreous state.

The transparent thermoplastic film used for application of the present invention will be a film of poly(ethylene terephthalate) having a glass transition temperature (Tg), measured by DMA (dynamic mechanical analysis) between 50° C. and 150° C. or a film of cellulose triacetate having a Tg between 100° C. and 180° C.

The thickness of this film of the thermoplastic polymer is preferably between 50 μm and 150 μm, in particular between 60 μm and 100 μm.

This polymer film is coated on one of its faces with an anti-abrasion coating known as such. It is preferably an anti-abrasion coating of the nanocomposite varnish type based on silica dispersed in an organic matrix. Varnishes of this kind are described in detail for example in U.S. Pat. No. 5,619,288, EP 0 614 957 and in international application WO 02/00561. Among the anti-abrasion coatings employed in the context of the invention, we may mention the coatings obtained from epoxyalkylalkoxysilanes, such as γ-glycidoxypropyltrimethoxysilane (GLYMO), and alkylalkoxysilanes, such as dimethyldiethoxysilane (DMDES), or hydrolysates of these compounds, and a catalyst such as aluminium acetylacetonate. Preferably, the anti-abrasion coating also contains a colloidal binder, such as a metal oxide or silica.

This anti-abrasion coating can be applied according to known methods, for example by immersion (dip coating), centrifugation (spin coating), by spreading (bar coating) or by spraying (spray coating).

The thickness of this anti-abrasion coating is similar to that of the known anti-abrasion coatings and is generally between 1 and 15 μm, preferably between 2 and 10 μm.

Various families of adhesives can be used in the context of the invention. These adhesives preferably have an elastic modulus, or Young's modulus, less than that of the substrate and less than that of the thermoplastic film. In general the adhesive has an elastic modulus at room temperature between $10^3$ and $10^8$ Pa (pascal). The adhesives according to the invention are pressure-sensitive adhesives (PSAs) and hot-melt adhesives (HMAs).

PSA means a dry contact adhesive, generally of a viscoelastic nature, which only requires light pressure to adhere to the contact surface. The PSAs are characterized in that they do not require activation by water, a solvent or by heating to exert their adhesive character permanently on a contact surface.

Advantageously, the pressure-sensitive adhesive (PSA) used is selected from the group comprising a compound based on polyacrylate, a block copolymer based on styrene and a mixture containing a natural rubber. More particularly, we may mention, as non-limiting examples, PSAs of general compositions based on polyacrylates, polymethacrylates, ethylenic copolymers such as ethylene-vinyl acetate, ethylene-ethyl acrylate and ethylene-ethyl methacrylate copolymers, PSAs based on synthetic rubber and elastomers including silicones, polyurethanes, styrene-butadienes, polybutadienes, polyisoprenes, polypropylenes, polyisobutylenes, PSAs based on polymers comprising nitriles or acrylonitriles, PSAs based on polychloroprene, PSAs based on block copolymers comprising polystyrene, polyethylene, polypropylene, polyisoprene or polybutadiene blocks, as well as mixtures of these polymers.

These PSAs can also contain one or more additives selected notably from tackifiers, plasticizers, binders, antioxidants, stabilizers, pigments, dyes, dispersants, and diffusing agents. Preferably, a PSA based on polyacrylate will be used in the context of the invention.

For the application envisaged in the present invention, it is important to select the PSA in such a way that the transparency of the optical article obtained is not reduced undesirably. The layer of PSA can of course have a cloudy appearance before application on the organic substrate, but this clouding must disappear after gluing.

The peeling force (peeling test at 90°) can vary between 10 and 25 N/25 mm.

The commercially available PSAs that are of interest for use as adhesive in the present invention are PSAs of optical grade, which are also widely used in the field of display screens. We may mention as examples products marketed by the company Nitto Denko, such as PSA CS 9621, or the adhesive 3M 8141, marketed by the 3M company.

The layer of PSA can be applied on the film of the thermoplastic polymer before or after application of the anti-abrasion hard coating, but is preferably applied after the latter. The PSA layer can optionally be protected by a layer with low adherence (release layer), which will be detached directly before application of the process.

In the context of the invention, it is also possible to use a hot-melt adhesive (HMA). The term hot-melt adhesive includes the conventional HMAs, which can melt and harden a large number of times, but also the reactive HMAs, which are applied like conventional HMAs but crosslink and thus form permanent adhesive bonds that cannot be melted again.

Hot-melt adhesives of optical grade are preferably adhesives based on polyurethanes, which are in the form of aqueous dispersions of polyurethanes of high molecular weight. The company Bayer markets two suitable hot-melt adhesives under the designations Dispercoll® U 42 and KA-8758. The company Bond Polymers International LLC also offers two hot-melt adhesives in the form of aqueous dispersions of polyurethanes under the references Bondthane® UD-104 and Bondthane® UD-108.

These aqueous dispersions can be mixed, before application, with additives intended to modify their rheological, mechanical or optical properties. Thus, addition of a colloidal silica will be reflected in increased hardness and durability.

The hot-melt polymers can be selected from polyolefins, polyamides, polyurethanes, poly(urethane urea)s, poly(vinylpyrrolidone)s, polyesters, poly(ester amide)s, poly(oxazolines), and systems based on acrylic polymers. Polyolefins suitable as hot-melt adhesives are described for example in U.S. Pat. No. 5,128,388. Polyolefins selected from copolymers with elastomer blocks such as those comprising blocks of polystyrene, of polybutadiene, of polyisoprene or blocks which are copolymers of ethylene and of butylene are particularly preferred.

The thickness of the layer of adhesive is generally between 10 and 50 μm, preferably between 15 and 30 μm.

The gluing step (C) of the method according to the invention is preferably preceded by a step of thermoforming of the bilayer structure prepared in step (B), at a temperature below the glass transition temperature of the thermoplastic polymer. This thermoforming step essentially has the purpose of giving the bilayer structure a shape similar to that of the surface on which it will be glued, in order to avoid stresses, folds or damage of the multilayer film during the gluing step. The thermoforming temperature is preferably at least 10° C. lower than the glass transition temperature.

The thermoforming and gluing of the multilayer film on the organic glass substrate can be carried out according to techniques known by a person skilled in the art. We may mention, as examples of said methods, those described in detail in applications EP 2018262 and WO 2006/105999, both in the name of the applicant.

The antireflection coating used in the present invention is known as such, and is notably described in patent application WO 2004/111691 (page 9, lines 20-26, and page 19).

The invention finally relates to a method for reducing the cracking of the antireflection coating of an optical article comprising a transparent substrate of organic glass, an anti-abrasion coating and a multilayer antireflection coating formed from alternating mineral layers with high and low refractive index; said method comprising the step of:

positioning a transparent film of thermoplastic polymer selected from cellulose triacetate (CTA) and poly(ethylene terephthalate) (PET) between the transparent substrate and the anti-abrasion coating, said transparent film being fixed on the transparent substrate by means of an adhesive layer selected from a layer of pressure-sensitive adhesive or a layer of hot-melt adhesive.

EXAMPLE

Preparation of Ophthalmic Lenses According to the Invention

Step (A)—Providing an Organic Substrate

Two types of organic glass are used (a) a glass of thermoset polythiourethane having a refractive index of 1.6, marketed by Essilor under the name Ormix®.

All the glasses undergo a surface treatment with oxygen plasma under reduced pressure.

Each batch of glass is divided into two subbatches, one intended to receive, according to the invention, a thermoplastic film covered with an anti-abrasion hard coating and an antireflection coating, and the other intended to receive a primary coat of elastomer, an anti-abrasion hard coating and an antireflection coating (comparative glasses according to the prior art).

Step (B)—Depositing an Anti-Abrasion Coating on a Thermoplastic Film

The following is used as transparent thermoplastic film
a film of cellulose triacetate (FT TD 80SL marketed by the company Fuji) with a thickness of 80 µm and a glass transition temperature, determined by dynamic mechanical analysis (DMA), of 170° C.

The surface of this film undergoes cleaning by treatment with an aqueous solution of soda, of 10% concentration, at 60° C. for 4 minutes, followed by a rinsing step with softened water and drying with hot air (60° C.).

A thermosetting solution for anti-abrasion coating (comprising, relative to the total weight of the composition, 22% of glycidoxypropylmethyldimethoxysilane, 62% of colloidal silica contained at 30% in methanol, and 0.70% of aluminium acetylacetonate) is deposited in a thickness of about 4 µm on one of the surfaces of this film by spin coating. This layer is then submitted to crosslinking by heating for 3 hours at 100° C. The thermosetting solution and the process for obtaining the anti-abrasion coating are described in example 3 of patent EP0614957B1.

A layer of acrylic PSA (Nitto CS9621) is then applied in a thickness of about 25 µm on the opposite face of the films thus obtained.

This structure with three layers is then thermoformed at a temperature of about 100° C. in order to give it the shape of the surface on which it will be glued.

Step (C)—Gluing

The gluing of the multilayer films on the organic glass lenses is carried out by the method described in WO 2006/105999 by application of a uniform pressure of about 0.03 MPa by means of a deformable pad. One film is glued on each of the faces of the substrate.

Step (D)—Depositing a Multilayer Antireflection Coating

A Crizal® Alizé® or Crizal Forte® antireflection coating which are notably described in patent applications WO2004/111691 and WO2008/107325 respectively, is deposited on the surface of the anti-abrasion coating.

Preparation of Comparative Ophthalmic Lenses

A primary coat based on a latex of elastomeric polyurethane and an anti-abrasion varnish (see step (B) above) are deposited successively on the substrate described above (Ormix®) by dip coating. The lenses thus prepared are then given a Crizal® Alizé® or Crizal Forte® antireflection coating in conditions strictly identical to those used for the lenses according to the invention, so that the comparative lenses differ from the lenses according to the invention only in that they have the elastomer primary coat, instead of the film of cellulose triacetate (CTA) and the adhesive.

Evaluation of the Thermal Resistance of the Antireflection Treatment

The lenses according to the invention and the comparative lenses are heated at a temperature of 80° C. for one hour. They are left to cool to room temperature and the surface is examined for any cracking of the antireflection coating. In the absence of cracking, the same lenses are heated again for one hour at a temperature 10° C. higher than the preceding temperature, then cooled and examined This cycle of heating/cooling is repeated at increasing temperatures (intervals of 10° C.) until cracks appear. The critical temperature is the lowest temperature causing appearance of said cracks.

Table 1 shows the critical temperatures found for two ophthalmic lenses according to the invention with a Crizal® Alizé® and Crizal Forte® coating, compared to ophthalmic lenses according to the prior art that have a primary coat based on latex instead of the thermoplastic film.

For the lenses with the Crizal Forte® coating, the measurements were repeated after 1 month, and then again after 3 months of storage.

Evaluation of the Mechanical Strength of the Antireflection Coating

A compressive load of 50 daN is applied, at room temperature, at the centre of the lens for 10 seconds. After examining the lens surface for any cracks, application of a compressive load is resumed, with a nominal value 5 daN greater than that applied previously. This cycle is repeated until cracks appear in the antireflection coating. The critical load is the lowest load for which cracks were observed.

For the critical temperature, 3 glasses are tested for an overall result.

For the critical load, 6 glasses are tested for the mean value shown below. The differences obtained are significantly larger than the uncertainty of reproducibility of the test.

TABLE 1

Critical temperature and critical load of antireflection ophthalmic lenses

| | According to the invention | Comparative | According to the invention | Comparative |
|---|---|---|---|---|
| | Crizal ® Alizé ® Anti-abrasion CTA film Polythiourethane substrate CTA film Anti-abrasion Crizal ® Alizé ® | Crizal ® Alizé ® Anti-abrasion Latex primary coat Polythiourethane substrate Latex primary coat Anti-abrasion Crizal ® Alizé ® | Crizal Forte ® Anti-abrasion CTA film Polythiourethane substrate CTA film Anti-abrasion Crizal Forte ® | Crizal Forte ® Anti-abrasion Latex primary coat Polythiourethane substrate Latex primary coat Anti-abrasion Crizal Forte ® |
| | | Critical temperature | | |
| $T_0$ | >120° C. | 100° C. | 120° C. | 100° C. |
| $T_0 + 1$ month | | | 110° C. | |
| $T_0 + 3$ months | | | 110° C. | 80° C. |
| | | Critical load | | |
| Thickness at lens centre | 1.3 mm | 1.2 mm | 1.3 mm | 1.2 mm |
| Critical load | 200 daN | 118 daN | 195 daN | 90 daN |

It is found that replacement of a conventional latex-based elastic primary coat with a film of the thermoplastic polymer translates into an increase in critical temperature of at least 20° C. This increase is further accentuated over time: after three months the critical temperature of the Crizal® F lens according to the invention is still equal to 110° C., whereas that of the corresponding comparative lens has decreased to 80° C.

Replacing the latex-based primary coat with a thermoplastic film also increases the critical load of the antireflection coatings. It is close to 200 daN for the lenses according to the invention, whereas it does not exceed 120 daN for lenses according to the prior art.

Overall, it can therefore be seen that the film of thermoplastic polymer glued on the substrate reduces the sensitivity of the antireflection coatings to deformations of the substrate, whether they are caused by thermal expansion or mechanical stress.

The invention claimed is:

1. An optical article, comprising:
   a transparent substrate of organic glass;
   an adhesive layer covering at least one of the faces of the transparent substrate;
   a transparent film of thermoplastic polymer fixed on the transparent substrate by means of an adhesive layer;
   an anti-abrasion hard coating covering the transparent film of thermoplastic polymer; and
   a multilayer antireflection coating formed from alternating mineral layers with high and low refractive index;
   wherein the thermoplastic polymer forming the transparent film is selected from cellulose triacetate (CTA) and poly (ethylene terephthalate) (PET); and
   the adhesive layer is a layer of pressure-sensitive adhesive or a layer of hot-melt adhesive.

2. The optical article according to claim 1, wherein the thermoplastic polymer forming the transparent film has a glass transition temperature, measured by dynamic mechanical analysis, between 50° C. and 250° C.

3. The optical article according to claim 2, wherein the thermoplastic polymer forming the transparent film has a glass transition temperature, measured by dynamic mechanical analysis, between 70° C. and 200° C.

4. The optical article according to claim 1, wherein the transparent film of thermoplastic polymer has a thickness between 50 μm and 150 μm.

5. The optical article according to claim 1, wherein the anti-abrasion coating has a thickness between 1 μm and 15 μm.

6. The optical article according to claim 1, wherein the thickness of the adhesive layer is between 10 μm and 40 μm.

7. A method of manufacturing an optical article according to claim 1, comprising the steps of:
   providing a transparent substrate of organic glass;
   depositing an anti-abrasion coating on a transparent film of thermoplastic polymer thus forming a bilayer structure;
   gluing the bilayer structure by means of an adhesive layer onto the transparent substrate; and
   forming a multilayer antireflection coating consisting of alternating mineral layers of high and low refractive index, on the anti-abrasion hard coating.

8. The method according to claim 7, wherein the gluing step is preceded by a step of thermoforming of the bilayer structure at a temperature below the glass transition temperature of the thermoplastic polymer.

9. The optical article according to claim 7, wherein said transparent substrate is a substrate of an ophthalmic lens.

10. The optical article according to claim 1, wherein the thermoplastic polymer forming the transparent film has a glass transition temperature, measured by dynamic mechanical analysis, between 70 and 200° C.

11. The optical article according to claim 1, wherein the transparent film of thermoplastic polymer has a thickness between 60 μm and 100 μm.

12. The optical article according to claim 1, wherein the anti-abrasion coating has a thickness between 2 μm and 10 μm.

13. The optical article according to claim 1, wherein the thickness of the adhesive layer is between 15 and 30 μm.

14. The optical article according to claim 1, wherein said transparent substrate of organic glass is a substrate of an ophthalmic lens.

15. A method for reducing the cracking of the antireflection coating of an optical article comprising a transparent substrate of organic glass, an anti-abrasion coating and a multilayer antireflection coating formed from alternating mineral layers with high and low refractive index; said method comprising the step of:

positioning a transparent film of thermoplastic polymer selected from cellulose triacetate (CTA) and poly(ethylene terephthalate) (PET) between the transparent substrate and the anti-abrasion coating, said transparent film being fixed on the transparent substrate by means of an adhesive layer selected from a layer of pressure-sensitive adhesive or a layer of hot-melt adhesive.

* * * * *